US008989370B1

(12) United States Patent
Howell et al.

(10) Patent No.: US 8,989,370 B1
(45) Date of Patent: Mar. 24, 2015

(54) CUSTOMIZABLE CALL CENTER DIALING SYSTEM, METHOD AND COMPUTER PROGRAM PRODUCT

(76) Inventors: Chris Howell, Chico, CA (US); James Howell, Chico, CA (US)

( * ) Notice: Subject to any disclaimer, the term of this patent is extended or adjusted under 35 U.S.C. 154(b) by 183 days.

(21) Appl. No.: 13/312,676

(22) Filed: Dec. 6, 2011

(51) Int. Cl.
*H04M 3/00* (2006.01)
*H04M 5/00* (2006.01)
*H04M 3/51* (2006.01)

(52) U.S. Cl.
CPC .............. *H04M 3/00* (2013.01); *H04M 3/5158* (2013.01); *H04M 3/5183* (2013.01); *H04M 2203/403* (2013.01); *H04M 2203/401* (2013.01)
USPC .................................................. 379/266.07

(58) Field of Classification Search
CPC ................. H04M 2203/401; H04M 2203/403; H04M 2203/407; H04M 3/5158; H04M 3/5183
USPC ........................................ 379/266.07, 266.08
See application file for complete search history.

(56) References Cited

U.S. PATENT DOCUMENTS

| 5,815,566 | A  | * | 9/1998  | Ramot et al. ............. 379/210.01 |
| 6,954,529 | B2 | * | 10/2005 | Gill et al. .................... 379/266.1 |
| 2004/0202309 | A1 | * | 10/2004 | Baggenstoss et al. ... 379/265.06 |
| 2005/0002515 | A1 | * | 1/2005 | Mewhinney et al. .... 379/266.08 |
| 2005/0091071 | A1 | * | 4/2005 | Lee .................................... 705/1 |

* cited by examiner

Primary Examiner — Nafiz E Hoque

(57) ABSTRACT

A customizable call center dialing system, method and computer program product for providing computer based training module that permits an administrator to selectively adjust campaign variables associated with a calling campaign. The system preferably includes a server, a dialing algorithm having a plurality of variables associated with a dialing campaign wherein the dialing algorithm is executed by the server. An administrator interface is in communication with the server, and at least one agent interface in communication with the server. A dialing engine is controlled by an output from the dialing algorithm wherein the administrator interface permits an authorized user to selectively modify the output of the dialing algorithm. Advantageously, at least one dialing parameter can be modified, in real-time, such that a new call is predictively initiated close to a time when the call agent finishes a previous call.

9 Claims, 16 Drawing Sheets

CUSTOMIZABLE CALL CENTER DIALING SYSTEM, METHOD AND COMPUTER PROGRAM PRODUCT

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE DISCLOSURE

1. Technical Field

The present disclosure relates generally to systems and methods for call center dialing, and more specifically a call center dialing system, method and computer program product for providing adjustable (customizable) algorithms that include predictive dialing functions conforming to continuous changes in both state and federally mandated guidelines such as do-not-call (DNC) and data scrubbing guidelines, for example.

2. Prior Art

Telephone call centers represent the front line for customer contact for new and current customers. In order to handle the volume of calls and the diversity of calling needs, predictive dialers are utilized to combine voice services with data services to provide seamless voice connectivity for the agent (an agent being a call center employee or representative, as the case may be) with low hold times. At times users need to adjust the dialing algorithm, and when using existing proprietary software, a highly trained Network Administrator is often required to setup a remote or local agent to dial. It is understandable that these methods are inadequate at times, in particular because existing technologies use older, out of date algorithms and are not adjustable for individual company needs. Most prior art is based on pre-internet technologies, and outdated un-adjustable dialing variables, and are therefore unable to meet the changing needs of the consumer or the requirements federally mandated guidelines for call center calling.

The use of certain prior art products such as the system described in U.S. Pat. No. 5,247,569, uses standard tasks and a dialing algorithm based on measuring past calls and predicting when to call next, based on those past results. While this technique was useful, it doesn't take into account federal requirements for call center compliance, drop rates, abandoned call messages, or answering machine messages that are required by law to be left on the recipient's answering machine.

In addition, these systems do not take into account the guidelines for do-not-call (DNC) compliance and data scrubbing that is required by federal law. Each business, depending on its type, will have federal requirements and likewise state guidelines for dialing in that state. The prior art is not dynamic or adjustable to meet the continuing changes in federal/state guidelines.

Accordingly, a need remains for a dynamic (adjustable) call center dialing system and associated method for customizing the algorithm thereof in order to overcome the above-noted shortcomings.

SUMMARY OF THE PRESENT DISCLOSURE

The present disclosure meets the above-mentioned needs by providing a system, method, and computer program product for customizing a call center dialing algorithm that is able to continuously conform to changing state/federal guidelines.

The present disclosure overcomes the aforementioned prior art shortcomings by using a combination of a unique dialing algorithm, versatile administrator adjustable settings, and Erlang C formula to determine delay between calls and max lines to dial per agent and per campaign. The problem of adjusting the dialing for individual business needs is overcome with complete compliance with federal laws and issues. Because of the fact that laws change, that businesses require change, and consumers as a whole are always changing, the call center dialing system of the present disclosure accomplishes these tasks by the use of adjustable dialing lines for each agent, adjustable call drop rate times, options for leaving messages on answering machines, and a message played for any call that hasn't been routed within two seconds, all of which are FTC requirements. Also, abandoned call messages would enable the administrator to adjust the dialer as the needs of the business and laws dictate.

The call center dialing system of the present disclosure provides substantial improvements over prior art. By using new technology that allows full integration to the internet for standardization, and non-proprietary requirements such as the operating system or hardware, agents can log in from anywhere there is internet access and dial as desired. This new technology also gives full security compliance and encryption via the Internet, so no VPN or other connecting mechanism is needed.

A non-limiting exemplary embodiment of the present disclosure preferably includes an administrator user interface that provides the main entry point for an administrator to setup the dialing system a dialing engine that interfaces with the hardware and phone lines; an agent interface that connects the agent to the system both data and voice, and; a database that saves all work and settings generated.

A non-limiting exemplary embodiment of the present disclosure preferably includes an administrator user interface preferably including pages of options and variable settings to setup a "Campaign". A campaign is a combination of all the dialing variables, phone numbers to dial, and other dialing parameters and system settings that are specific for that calling campaign. All of these settings are written to a database and are saved for each specific campaign. This is also where the administrator can Start, Pause, or Idle the campaign. Due to the simplicity of the user interface, the unique dialing engine, and the processes of the present disclosure, administrators do not have to be highly trained as required with prior art systems. Training takes just a few hours instead of days, even weeks. The importance of the user friendliness of the present disclosure substantially broadens its appeal. In fact, it may be set up and used by relatively small, and inexperienced, businesses that otherwise could not afford their own call center, or would have to hire an outside contractor.

A non-limiting exemplary embodiment of the present disclosure preferably includes a computer based training module. This computer based training module (CBT) provides live training to agents as they call. This CBT may include text slides, pictures, audio and video training materials. Since the CBT is web based, in one embodiment, the training materials can be of any format supported by any standard W3 compliant web server and browser. The CBT module is customizable and created by the manager during campaign setup. The CBT module can be changed, and or copied to another campaign for re-use saving time. On most all predictive dialing systems, an agent logs into the dialing system to receive calls, they will receive campaign script pages with a telemarketing script containing customer information as well as the selling script they are to read back to the customer. After the call is finished, the customer disposes the call. At this point, with conventional approaches, the agent would stare at a blank window waiting for the next call to come in. This 'waiting' time can be up to 3 or 4 minutes, adding up to several hours of wasted time in between calls during a single week. Exemplary embodiments of CBT fill that time with training materials for that campaign. While the agent waits for the next call, training materials can be played, to a specific agent, set of agents, or campaign.

The CBT may include an algorithm that is configurable so training scripts can be targeted to each representative based on past call result codes. For example, if agent 1 disposes over 50% of his calls as 'No Thanks—Can't afford', he/she would automatically receive the training pages on how to close a sale. The CBT algorithm can be manipulated to specify individual training per campaign or per agent. The manager (administrator) has the option to show all training pages, only specified training pages, or no training pages. This eliminates down time between calls and trains agents tailored to their needs, while the agent is working.

The dialing engine is an important feature of the call center dialing system, the engine routes both voice from the telephony and data from the database, to the appropriate agent, or pre-recorded voice message according to the dialing variables and other specific campaign settings.

The database is preferably RDBMS (relational database management software) to maintain data store standards that are exchangeable with other RDBMS on the market. This means the call center dialing system is not forced to use a single database system, but any RDBMS data store will work with the call center dialing system, thus making the system compatible with a multitude of databases and companies. This call center dialing system is a customizable CRM (customer relation administrator) that maintains a complete database of all potential customers in the same system.

In a non-limiting exemplary embodiment of the present disclosure, the objectives of the present disclosure provide:
1) a call center dialing system that is adjustable to individual business needs on a campaign by campaign basis;
2) a mechanism for predictively calling customers and recording all relevant data in a RDBMS;
3) a mechanism for automatically calling customers and leaving a pre-recorded message without agents;
4) a mechanism for combining robo-calls (auto dialer), and the CRM system into one robust call center dialing system that utilizes an adjustable algorithm;
5) a mechanism for utilizing dialing technologies to reduce wasted off-phone time and improve customer contact;
6) a mechanism for predictively dialing customers that complies with federal regulations;
7) a mechanism for predictively dialing customers with adjustability to comply with various state regulations;
8) a predictive dialing system that is adaptable to existing computer hardware and does not require, dedicated, proprietary hardware systems;
9) a predictive dialing system that may be accessed via an internet connection;
10) a predictive dialing system that has digital recording for voicemail;
11) a predictive dialing system that is easy to use and does not require highly trained technicians; and
12) a mechanism for training agents by using a customizable computer based training module for agents.

Furthermore, it is an object of this present disclosure to illustrate the preferred embodiments and broadly state the methodologies that may be used in order to utilize a call center dialing system.

BRIEF DESCRIPTION OF THE SEVERAL VIEWS OF THE DRAWING

The novel features believed to be characteristic of this disclosure are set forth with particularity in the appended claims. The disclosure itself, however, both as to its organization and method of operation, together with further objects and advantages thereof, may best be understood by reference to the following description taken in connection with the accompanying drawings in which:

FIGS. 12-13 are exemplary screen images accessed by an administrator to set the campaign variables and dialing rules and to start, stop and idle the campaign;

FIGS. 14-15 are exemplary screen images accessed by an administrator to create the computer based training module, in accordance with an exemplary embodiment of the present disclosure.

DETAILED DESCRIPTION OF THE DISCLOSURE

The present disclosure will now be described more fully hereinafter with reference to the accompanying drawings, in which a preferred embodiment of the disclosure is shown. This disclosure may, however, be embodied in many different forms and should not be construed as limited to the embodiment(s) set forth herein. Rather, this embodiment is provided so that this application will be thorough and complete, and will fully convey the true scope of the disclosure to those skilled in the art.

The call center dialing system of this disclosure is referred to generally in FIGS. 1-16. It should be understood that the present disclosure also discloses a method and programmable computer program product that may be used to achieve the desired functions of a variety of call center dialing systems, and should not be limited to any particular call center dialing system disclosed herein.

Non-Limiting Exemplary Call Center Dialing System

Figure 16:
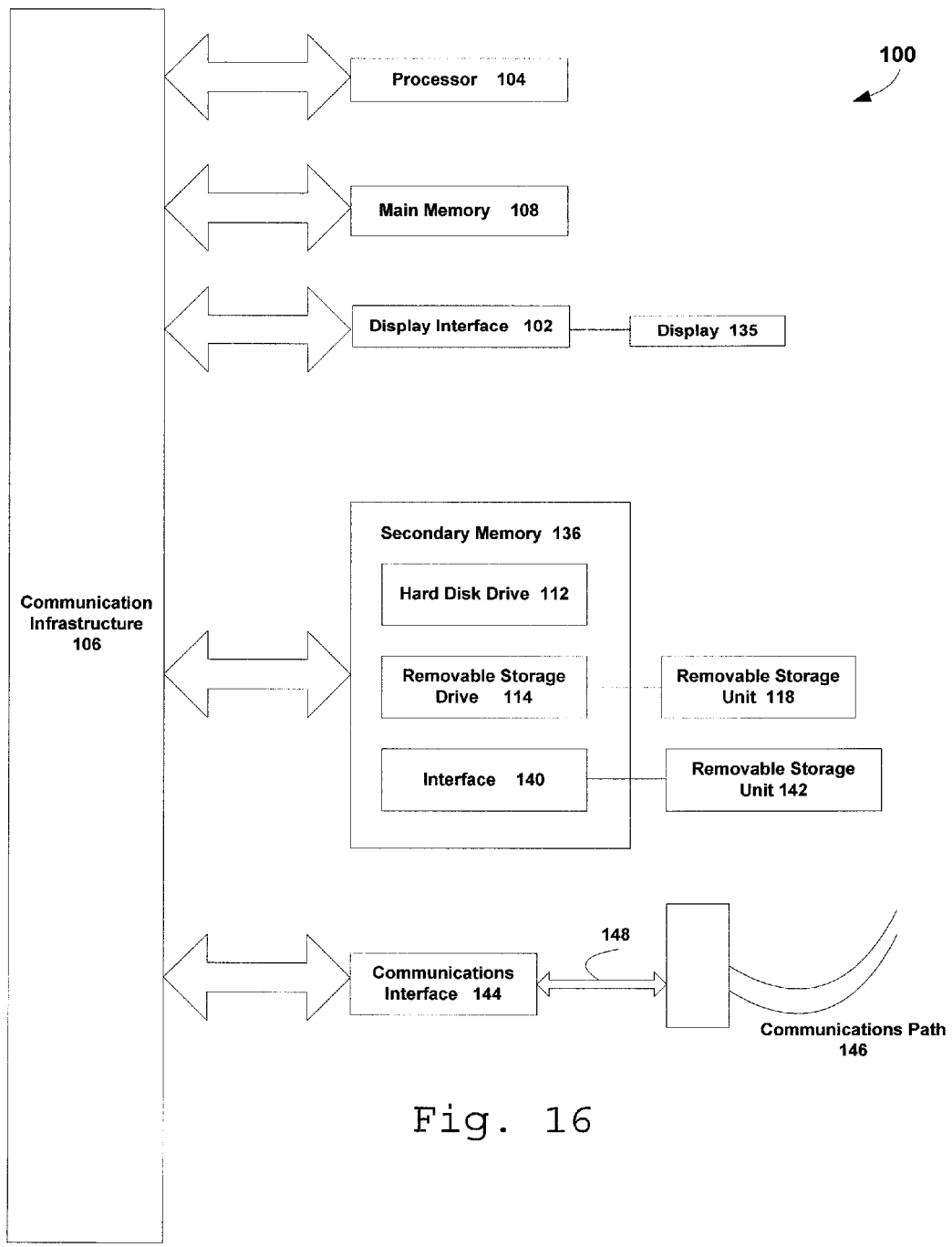
FIG. 16 is a block diagram of an exemplary computer system useful for implementing the present invention.

In one embodiment, the invention is directed toward one or more computer systems capable of carrying out the functionality described herein. An example of a computer system 100 is shown in FIG. 16.

Computer system 100 includes one or more processors, such as processor 104. The processor 104 is connected to a communication infrastructure 106 (e.g., a communications bus or network). Various software aspects are described in terms of this exemplary computer system. After reading this description, it will become apparent to a person skilled in the relevant art(s) how to implement the invention using other computer systems and/or architectures.

Computer system 100 can include a display interface 102 that forwards graphics, text and other data from the communication infrastructure 106 (or from a frame buffer not shown) for display on the display unit 135.

Computer system 100 also includes a main memory 108, preferably random access memory (RAM) and may also include a secondary memory 136. The secondary memory 136 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 136 may include other similar devices for allowing computer programs or other code or instructions to be loaded into computer system 100. Such devices may include, for example, a removable storage unit 142 and an interface 140. Examples of such may include a program cartridge and cartridge interface (such as that found in video game devices), a removable memory chip (such as an erasable programmable read only memory (EPROM), or programmable read only memory (PROM)) and associated socket and other removable storage units 142 and interfaces 140, which allow software and data to be transferred from the removable storage unit 142 to computer system 100.

Computer system 100 may also include a communications interface 144. Communications interface 144 allows software and data to be transferred between computer system 100 and external devices. Examples of communications interface 144 may include a modem, a network interface (such as an Ethernet card), a communications port, a Personal Computer Memory Card International Association (PCMCIA) slot and card, etc. Software and data transferred via communications interface 144 are in the form of non-transitory signals 148 which may be electronic, electromagnetic, optical or other signals capable of being received by communications interface 144. These signals 148 are provided to communications interface 144 via a communications path (e.g., channel) 146. This channel 146 carries signals 148 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 148. These computer program products provide software to computer system 100. The invention is directed to such computer program products.

Computer programs (also referred to as computer control logic) are stored in main memory 108 and/or secondary memory 136. Computer programs may also be received via communications interface 144. Such computer programs, when executed, enable the computer system 100 to perform the features of the present invention, as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112 or communications interface 144. The control logic (software), when executed by the processor 104, causes the processor 104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

Figure 1:
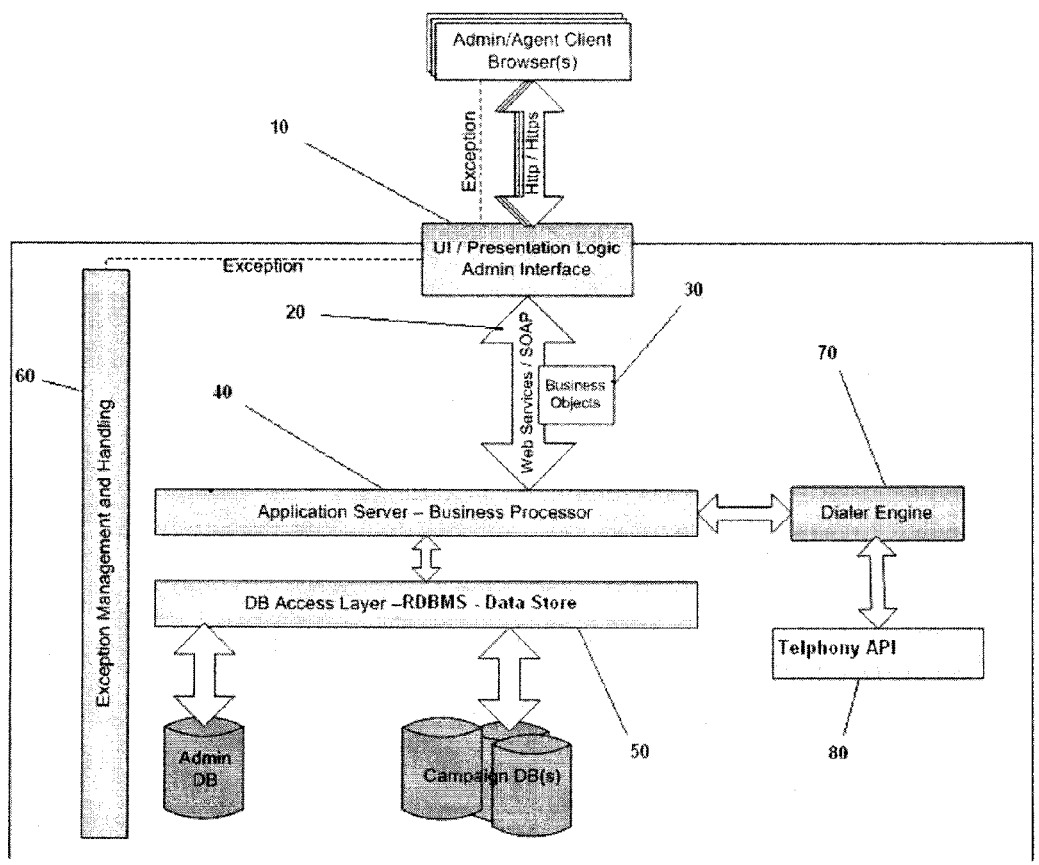
FIG. 1 is a high-level schematic block diagram illustrating the interrelationship between the major components of the call center dialing system, in accordance with an exemplary embodiment of the present disclosure.

As will be apparent to one skilled in the relevant art(s) after reading the description herein, the computer architecture shown in FIG. 1 may be configured as any number of computing devices such as a game console, a portable media player, a desktop, a laptop, a server, a tablet computer, a PDA, a mobile computer, a smart telephone, a mobile telephone, an intelligent communications device or the like.

In yet another embodiment, the invention is implemented using a combination of both hardware and software.

Referring now to FIG. 1, a non-limiting exemplary embodiment of the present disclosure preferably includes a user interface (UI) 10, such as a display screen showing a webpage that is an intuitive interface for users to interact with the application and navigate through the system of the present disclosure to configure dialing parameters and campaign system settings. The UI 10 may be in any number of suitable forms, for example web based, application based, or even PLC or hardware based, and so on.

As a non-limiting example, user interface 10 may include a variety of stand-alone or shared devices that are capable of generating and transmitting a control signal upon receiving a user input. For example, exemplary user interface devices may include a handheld computer, a PDA, a cell phone, a keyboard, a mouse, etc. that may be comprised of commercially available hardware and software operating systems, for example.

The aforementioned user interfaces are intended to represent a broad category of exemplary user interfaces capable of functioning in accordance with the present disclosure. Of course, the user interfaces may include other components, peripherals and software applications provided they are compatible and capable of cooperating with remaining devices of the present disclosure. In addition, the user interfaces may include information, documents, data and files needed to provide functionality and enable performance of methodologies in accordance with an exemplary embodiment of the disclosure.

Figure 2:
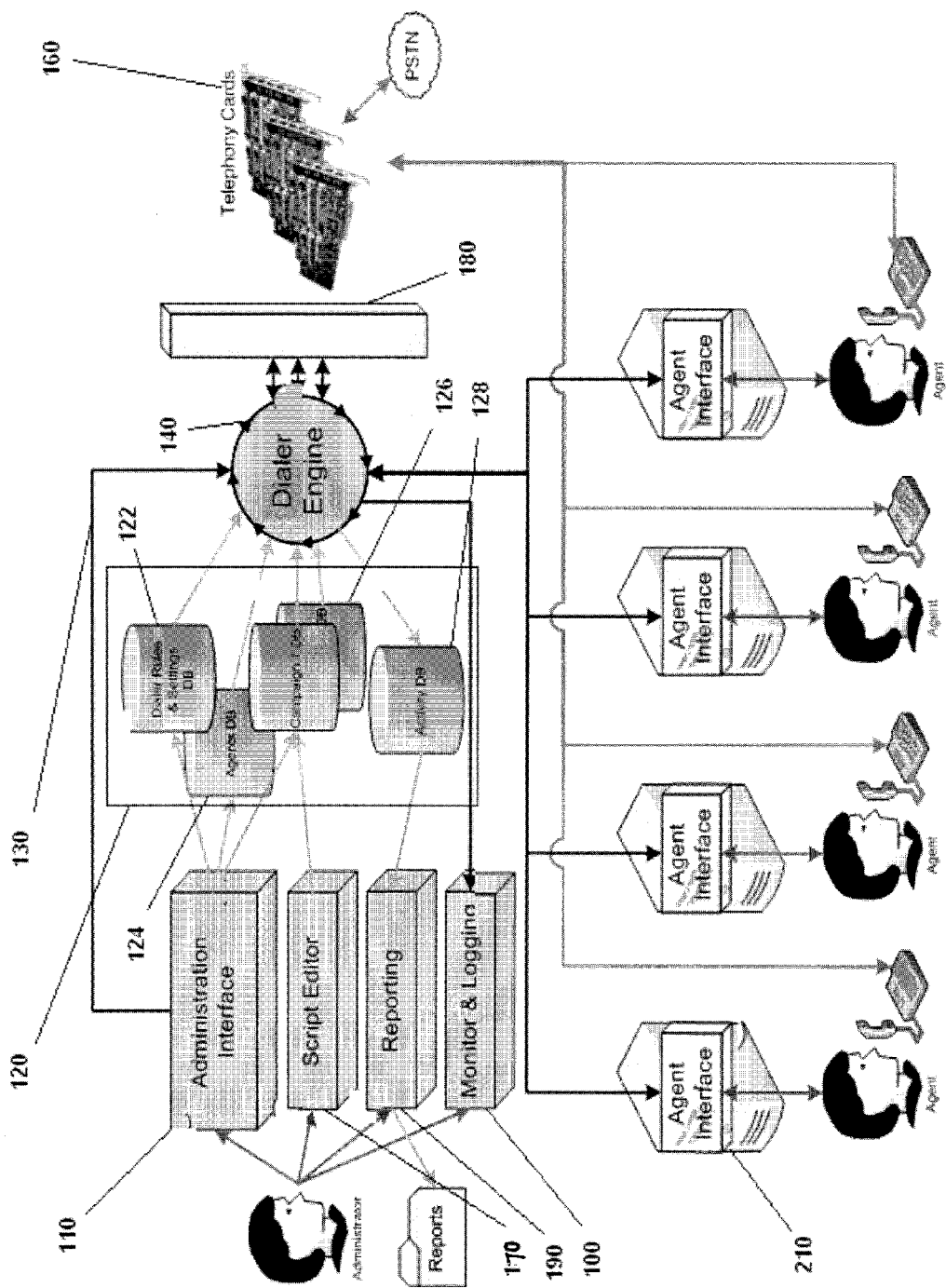
FIG. 2 is a sequential operations flow chart illustrating how a desired outcome is achieved, in accordance with an exemplary embodiment of the present disclosure.

Referring now to FIG. 2, the administration interface 110 may include a display screen configured for displaying various amounts of textual and/or graphical information. The display screen may be monochrome or color, of various physical dimensions, of various types. In one embodiment, the display may be suitable for displaying full motion video in color. By way of example and not limitation, the display may be comprised of a liquid crystal display (LCD); a field emission display FED; so called "E-ink" technologies, which employ microspheres having at least two reflectance states; a cathode-ray tube (CRT) display; a gas plasma display; an LED readout configured to display alpha-numeric and graphical information; or any other compatible visual display device. In a preferred implementation, the display is large enough to display, with clarity, one or more lines of information. Optionally, the display screen may be configured with a touch-screen interface, to present a user with a graphical user interface.

Referring back to FIG. 1, system configurations and settings are sent to a service-oriented architecture protocol (SOAP) 20 for distributed systems. SOAP relies on Extensible Markup Language (XML) for its message format, and usually relies on other Application Layer protocols, most notably Remote Procedure Call (RPC) and Hypertext Transfer Protocol (HTTP), for message negotiation and transmission. As an example, at least one business object may be employed. An object may be an abstract representation of entities or concepts that encapsulate both data and its related logic. The business object not only contains the data, but also includes the business logic that accompanies the data. Business objects 30 may include a data interchange specification (hereafter referred to as DIS), which is a robust and scalable resource for encapsulating business logic and data-processing.

The data from the DIS is sent to a business processor 40, such as an application server. This application server (processor) contains the business logic and is responsible to initiate campaigns using the dialer engine 70 which in-turn uses a telephony application programming interface 80 (API), —which is an interface implemented by a software program enabling it to interact with other software—to interface with the telephony hardware. Application server 40 will maintain the state of agents along with their availability status to initiate campaigns using the data store 50 that stores the saved settings from UI 10, which are stored in data store 50. Business logic processor 40 is a non-limiting exemplary connection to both the data store 50 and dialing engine 70.

The processor 40 may include a microprocessor or other devices capable of being programmed or configured to perform computations and instruction processing in accordance with the disclosure. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor.

Functions and process steps described herein may be performed using programmed computer devices and related hardware, peripherals, equipment and networks. When programmed, the computing devices are configured to perform functions and carry out steps in accordance with principles of the disclosure. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

Exception management 60 software process is computer software code that monitors the application for any illegal errors and plays an important role in preventing any unpleasant experience with the application to its users. Exception management 60 software process may include the functions of catching and throwing exceptions and designing the flow of exceptions till they are gracefully (in other words, "in a nice way") communicated to the application users. Exceptions are unforeseen errors in software, and may be handled by another software process that labels the error, and gives the agent or manager a notification of the type of error and exactly how to proceed. The exception management 60 software process may handle: A. Catching and throwing exception information; B. Flowing exception information, and/or; C. Publishing exception information. The exception management 60 software process may be one or more of the following based on the exception: A. Retry operation; B. Expose issue to the user, and; C. Stop, restart, or continue with the user interface flow of the application.

Non-Limiting Exemplary Mode of Operation

In FIG. 2, the present disclosure is shown in an exemplary setup for the call center dialing system. For example, administrator A has logged into UI 110 and has defined dialing variables and setting, result codes, data fields, dialing parameters, and the importing of phone numbers, which are stored in campaign database 120. Also accessible from UI 110 is script editor 180, where administrator A sets up the agent script, which will be used with each phone contact. This script editor 170 contains customer data fields as well as the script an agent will use with any one campaign. Administrator A may also access, through UI 110, the reporting module 190 to view statistics stored in monitoring and logging module 100. The statistics to be monitored and logged may include preset report parameters or may be dynamically created. For example, the administrator may access reporting module 190 to view the reports on the status and history of the dialing system as well as statistics measuring each campaign, agent, and the station's transactions, as required to measure compliance to FTC regulations.

In addition, the administrator has the ability to create a campaign and not use, or bypass, the script editor and use a paper, written script, or no script at all. Further, the administrator may also skip any set up process for the reporting module and thereby not use the reporting module; i.e. keep no records, only written records or otherwise.

The present disclosure is not limited to the use of any particular module. Likewise, the administrator may set up any one or more dialing parameters for a campaign as needed. Utilizing such parameters is only subject to the desired outcome. Furthermore, the various campaign databases, 120, 122, 124, 126, and 128, may be used as one single database (or referenced as such), to accomplish the objective of the present disclosure. Such campaign databases are separately shown merely for clarification. The hardware 180/160 shown in FIG. 2 may also be in any form such as a PCB, a router, and any other third party hardware or even a software device that delivers telephony services. The ability of switching over from one type of communication interface to another makes the present disclosure exceptionally versatile.

In FIG. 2, creation of campaigns by administrator A with UI 110 results in creation of a campaign database 120. Such a campaign database 120 stores customer contact information, such as phone numbers and may include one or more pre-defined schemes and pre-requisite data such as dialing rules and settings 122, agent database 124, specific campaign settings 126, and activity database 128, for example. This is the interface the administrator will use to setup all the parameters business logic, and dialing variables. In this manner, the present disclosure allows for the creation and storage of multiple campaigns, with multiple variations, mutually exclusive to one another. The number of campaigns could be in the hundreds and potentially in the thousands or more depending on the storage medium and hardware limitations.

As illustrated in FIGS. 1 and 2, settings are written to the campaign database 120, which may be a Relational Database Management System (RDBMS) 50. The parameters stored in campaign database 120 determine one or more dialing behaviors and rules that the engine reads from the database. Thus, administrator A has direct access 130 to engine 140 to command it to start, stop, or idle a campaign, thereby allowing an agent to sign in or sign out of a campaign.

As a non-limiting example, administrator A may use script editor 170 to create the script to be used in a campaign by an agent. The script editor 170 may be, but not limited to, a What You See Is What You Get (WYSIWYG) editor—a software component that allows for a laymen to use a click and drag method for creating web based pages or forms without any programming or any code—used for creating graphic and text based telemarketing scripts for agents, and also stores customer information. It is important to note that setting up a campaign with the present disclosure takes about one-half the time as exemplary prior art systems. For example, setting up a traditional prior art campaign taking about three hours, may take about only ninety minutes, or less, with the present disclosure. Another advantage is the ability to save various options such as, but not limited to: a) queries, b) data, c) fields, d) options, e) result codes, and f) scripts, for example. With this feature, an administrator can save even more time thereby cutting a three hour set up time on a future campaign down to a fraction of conventional methods employed today.

As a non-limiting example, when agent B logs into user interface, UI 210, there may be a selection of campaigns available for agent B to access and run. When the agent accesses a campaign, the campaign script automatically pops up on UI 210, which is agent B's entry point to begin the campaign. The campaign script on UI 210 may be the same script previously prepared by administrator A in the script editor 170. This campaign script is what agent B uses to read to the customer, and also provides the agent with stored customer information, which the agent can update, edit, add to, or delete, depending on the needs of the campaign. The use of customer information is optional and its use is not required. When an agent has ended a call, the agent dispositions the call as "ended" (for example, it was a hang up, a sale was made, a redial, etc.), which notifies dialer engine 140 that the agent is now available for the next routed call, or the next outgoing call.

In a non-limiting exemplary embodiment, as illustrated in FIG. 2, the present disclosure may also be used with no agents, referred to as "unmanned mode", also referred to as "virtual agent". To create a campaign in an unmanned mode, it is similar to using an agent, except there is no written script and instead, the administrator sets up a pre-recorded message or messages depending on whether the call is answered by a live contact or an answer machine, or otherwise. To activate the unmanned mode, the administrator sends a run command to the engine and dialing is initiated according to parameters of that campaign.

During any given phone call, additional voice options may be played based on the response of the contacted party. All of these parameters are established by the administrator when creating or modifying campaign parameters. This type of unmanned campaign falls under FTC federal guidelines, for example, use with political and non-profit organizations, and so on. It is also easy for the administrator to create a blended campaign that utilizes both an agent and also utilizes the unmanned function. For example, the unmanned mode may initiate a call and then be transferred to an agent to complete the calling objective.

The available campaigns are determined by administrator A commanding it to start, stop or idle. Starting gives the agent's UI 210 access to the campaign, stopping removes it from the agent's UI 210, and the administrator may elect to idle the campaign, for example, during a lunch break. Once agent B selects a campaign from his/her UI 210, the dialing engine 140 polls dialing variables from campaign database 120 and dials accordingly. In this case, dialing engine telephony API 180 to control telephony hardware 160, not limited to POTS, VoIP, Digital circuits, or the telephony hardware can be another device such as Asterisk PBX, VOIP, or another software or device that can do voice transmissions. The dialer engine 140 records all dialing transactions to campaign database 120 to be used for reporting module 190. The campaign created with its configured parameters is now underway and will continue to run indefinitely until it either runs out of phone numbers to dial or the administrator initiates a stop command or all agents are unavailable (for example, agents have logged out, paused the use while on break, etc.). The administrator also has the option of setting a start and stop time in the campaign database 120.

Figure 3:
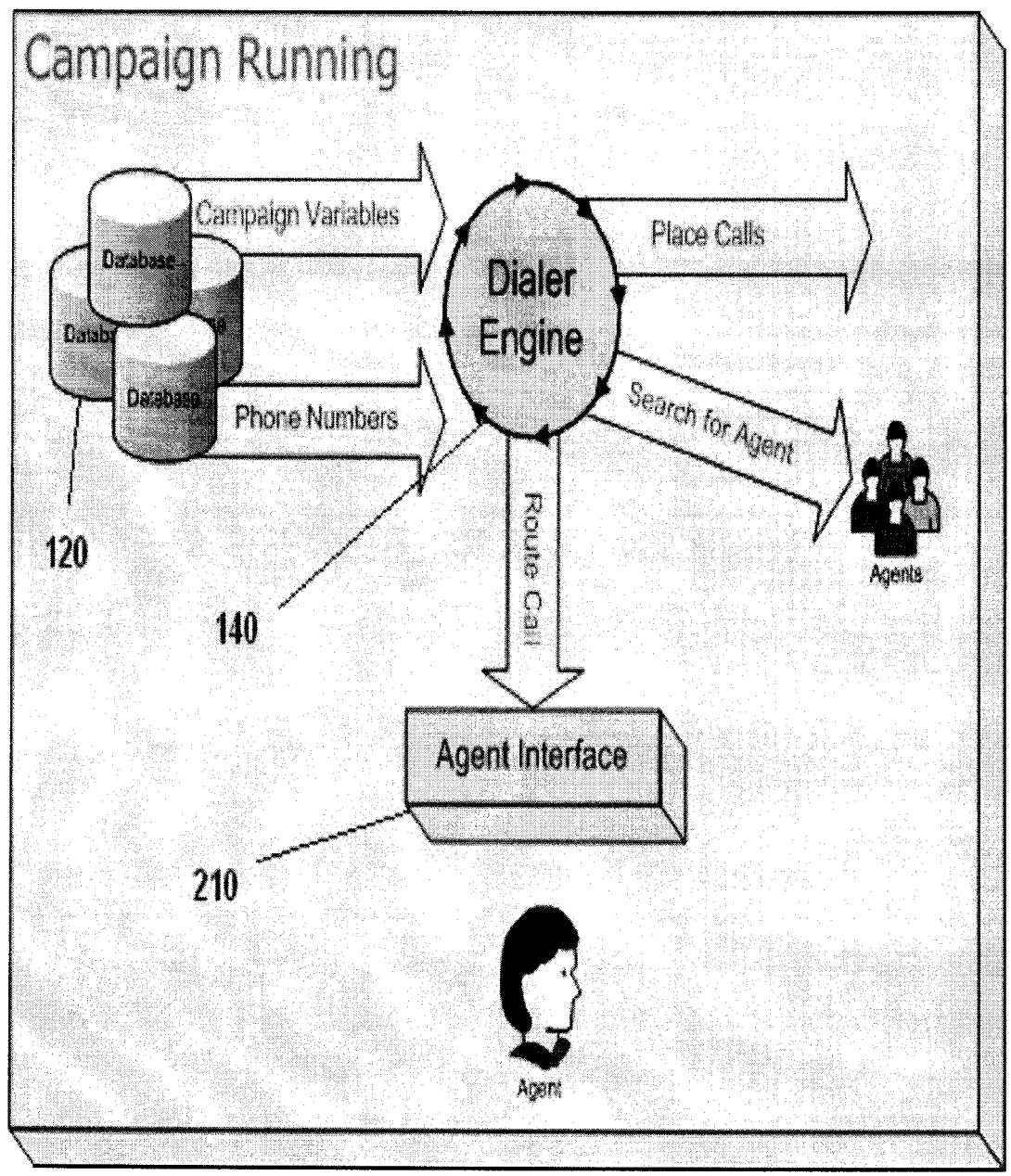
FIG. 3 is a high-level schematic block diagram illustrating an exemplary campaign operation process to provide the desired outcome.

In FIG. 3, the schematic block diagram illustrates an exemplary campaign running on the call center dialing system with campaign database 120 preferably having pre-defined schemes and pre-requisite data such as: dialing rules and settings 122, agent database 124, specific campaign settings 126, and activity database 128 read by engine 140, for example. Phone numbers and customer data in campaign database 120 are loaded as the dialer engine 140 progresses through the campaign, as dictated by the specific campaign settings 126.

The dialer engine 140 calls and attempts to quickly detect when a call has been answered by a live person L. Immediately upon determining that a live person is on the line, the dialer searches for the next available agent B based on search or routing rules as predetermined in specific campaign settings 122. Note that agents log in and out of the system using agent UI 210 throughout their shift, and the available pool of agents is constantly changing on a first come, first serve, basis to route calls. If all agents are available, the system will use a round-robin technique of sequentially routing calls based on predicted availability. For example, the next call waiting will be ready for the agent who has been idle the longest, or who is predicted to be the next agent available for a call. These dialing parameters are established and applied using a unique dialing algorithm illustrated in FIG. 4, and conform to federal guidelines (as required).

The dialing algorithm may be embodied on a computer readable medium, such as a memory. Thus, as a non-limiting example, the memory may include programmable software instructions that are executed by the processor 40. In particular, the programmable software instructions include a plurality of chronological operating steps that define a control logic algorithm for performing the intended functions of the present disclosure. Such software instructions may be written in a variety of computer program languages such as C++, Fortran and Pascal, for example. One skilled in the art understands that such software instructions may contain various Boolean logic processes that perform the intended function of the present disclosure. Therefore, the specific source or object code of the software program is not intended to be a limiting factor in executing the present disclosure's intended function.

The memory, which enables storage of data and programs, may include RAM, ROM, flash memory and any other form of readable and writable storage medium known in the art or hereafter developed. The memory may be a separate component or an integral part of another component such as processor 40.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement methods described herein.

It should also be noted that software that implements the disclosed methods may optionally be stored on a tangible storage medium, such as a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a non-transitive signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 4:
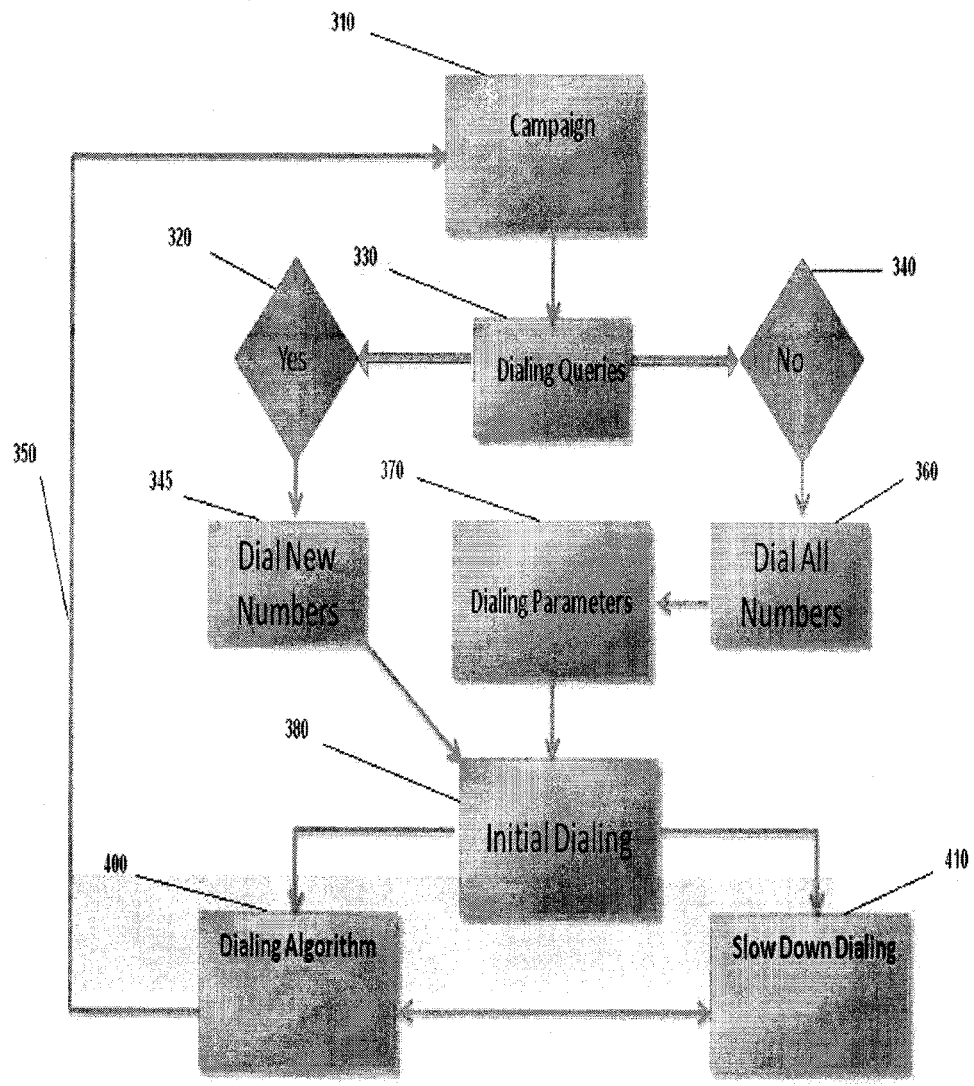
FIG. 4 is a flow chart illustrating an exemplary embodiment of a dialing engine and associated algorithm having campaign variables and system settings to provide the desired dialing outcome.

The algorithm in FIG. 4 illustrates an exemplary embodiment of the dialing process, preferably including two parts. When a campaign first starts dialing, it is preferably based on the dialing parameters configured by the administrator, and may not use the algorithm until a predetermined number of calls are made. For example, after twenty calls are made, sufficient call statistics are available for use by the algorithm to predictively determine when to place the next call. Based upon the algorithm and the dialing parameters set up by the administrator, the desired dialing outcome can be accomplished. The predictive dialing algorithm allows a system to automatically place calls for live agents in such a way as to cause a new call to begin close to the time when the agent finishes the previous call.

A non-limiting exemplary process in the dialing algorithm of the present disclosure may function in the sequential order described below.

Campaign 310 is configured and parameters are set according to the business rules, with desired dialing parameters set for that campaign as shown in FIGS. 2 and 3. Once all the campaign variables have been set, a dialing query 330 is created to determine which numbers to call out of the campaign. This dialing query 330 targets specific data in a campaign to be dialed, while not dialing the other data in the campaign. For example, it may be desirable to target only calls in a specific area code, or any other parameter, such as contact only new numbers, redial existing customers, or call only numbers with certain demographics, such as Spanish speaking contacts.

Once the dialing query 330 is set, the dialing process reads a variable setting called "dial through all numbers before redial in days," which will be either yes 320, or no 340. When this option is set to yes 320, the dialer will only dial new numbers 345 that are phone numbers that have not been called by the system. Once all numbers have been called in the query, the dialer stops dialing.

When the dialing query option 330 is set to no 340, the dialer will dial all numbers 360 that are available according to the dialing parameters (rules) 370. Once the rules are read from the dialing parameters 370, the initial dialing begins 380. This initial dialing process 380 will typically be the same regardless of the redial options that are selected in the dialing parameters (rules) 370. If no calls have been made at this point, the dialing engine uses preset dialing parameters 370, configured by the administrator, to dictate when, and how to dial. Then after the predetermined number of calls is completed, and sufficient data is created for the algorithm to use, it will automatically switch over to the algorithm.

Figure 5:
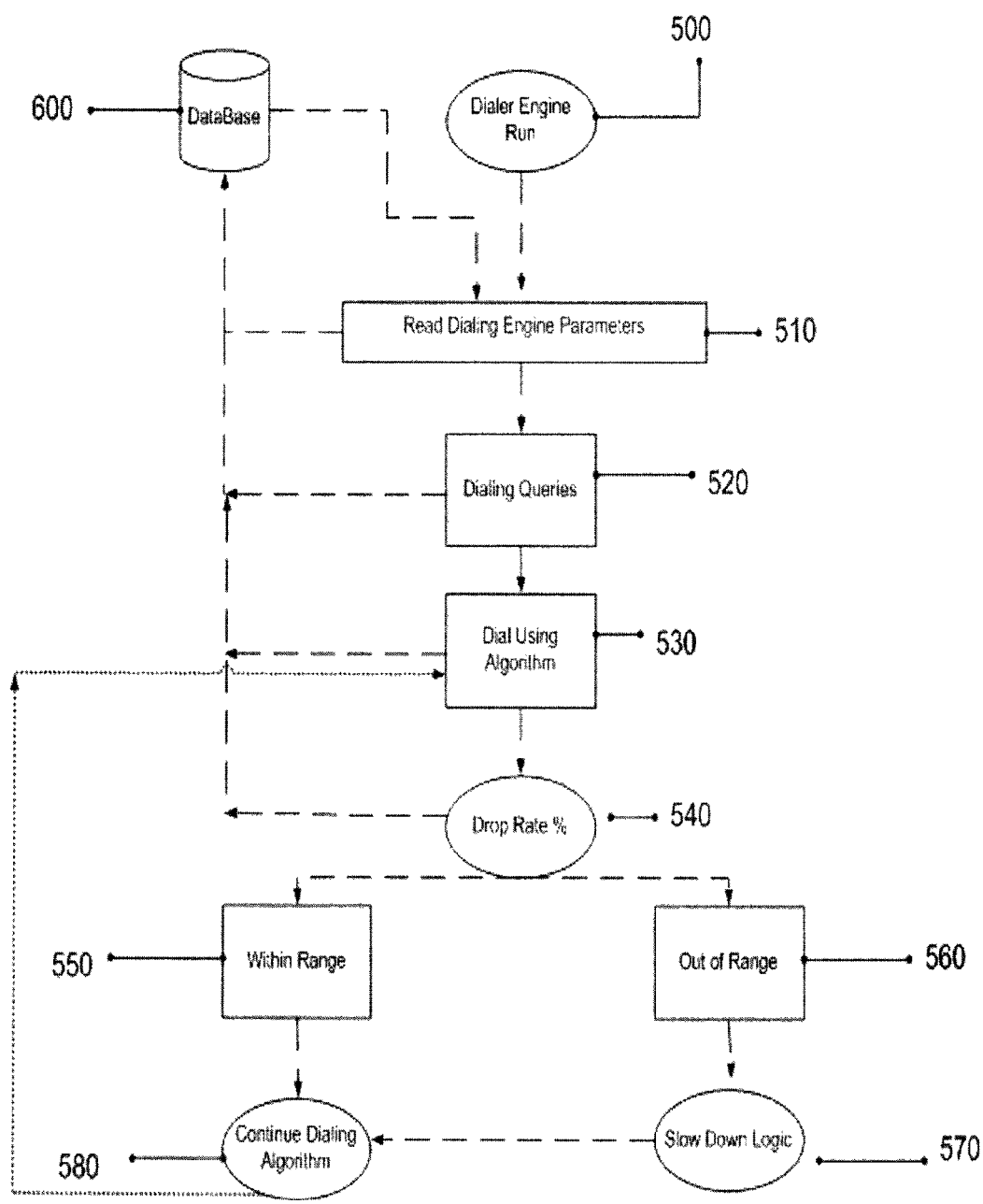
FIG. 5 is a flow chart illustrating the process steps of the customizable dialing algorithm, employed by an exemplary embodiment of the present disclosure.

As perhaps best shown in FIG. 5, after the algorithm 400 controls the dialing sequence, it takes into consideration several parameters setup by the administrator, which include but are not limited to: 1. Number of lines maximum to dial; 2) drop rate percentage; 3) ring count; 4) lines to dial per agent; 5) default call lapse time; 6) delay, and; 7) number of attempts allowed for each phone number. Thus, once a predetermined number of calls have been made, the dialing engine's algorithm 400 is effectively used to predictively determine when to place the next call, saving agent hold time, customer hold time, thus saving money and increasing profits.

The dialing algorithm 400 monitors the drop rate, as long as the drop rate is within the set range the administrator specified (or no more than 3% as established by federal and state laws). If the drop rate is equal to or greater than the specified setting, then the slow down dialing logic 410 is used to keep the dialing within the range specified in algorithm 400. When the slow down process gets the drop rate back within range, the dialing is handed back over to the dialing algorithm 400. This dialing process will go on until the dialing query runs out of data and stops 350 and a prompt will alert the administrator that the campaign has stopped. It may also be stopped at any time by the administrator.

A non-limiting exemplary embodiment of the dialing algorithm may include, at least in part, an arithmetic formula using a combination of Erlang C traffic calculations, and administrator settings that can be used in collaboration to tweak the call center system to be used in a variety of business environments, with a variety of campaigns based on the desired outcome. By measuring how many calls were made in any specified time period, the average duration of those calls (including wrap up times), the average time to answer, and the average delay tolerated in answering all of the calls, the dialing engine can predictively determine when to dial the next number.

The aforementioned dialing algorithm is a particularly valuable asset in that it can be used by small businesses and relatively inexperienced operators to perform functions that would otherwise have to be conducted by an outsourced call center. Otherwise, a business must hire trained technicians and comparatively expensive call center hardware. Likewise, dedication of space would be required whereas with the present disclosure, the software may be incorporated into an existing computer network.

In a non-limiting exemplary embodiment, the dialing algorithm may use a call drop rate, and by using a line multiplier to determine the lines to use per agent, the dialing speed is automatically adjusted and the efficiency of the dialing engine increases. Another advantage in the present disclosure is the ability to adjust the default call time (DCT); this is the time after a call completes before the algorithm initiates next call time (NCT). Using this feature can immediately speed up the number of dials in a given time period, thus greatly increases the number of live contacts and more sales.

A non-limiting exemplary embodiment of the dialing algorithm, the following process steps may be executed:
1. Get all active dialing queries and iterate (Iteration in computing is the repetition of a process within a computer program) over the dialing queries sequentially.
2. Get all phone numbers associated with the dialing queries, iterate over the numbers associated with the dialing queries.
3. Get the phone number from dialing queries and validate whether it is dialable (valid) or not according to dialing parameters set by the administrator.
4. If phone number is valid then, count the number of logged-in agent(s), multiple by the number of lines per agent(s).
5. If lines and agent(s) are available, then dialing process starts based on lines per agent(s) setting.
6. If initial dialing is done, then wait for pre-established time period set for the campaign, this is the default call time (DCT) setting.
7. If drop rate percent is less than what is set in algorithm's dialing parameters, then it evaluates the next call time (NCT) using predictive algorithm 400 and continues to dial.

In a non-limiting exemplary embodiment, a portion of the algorithm logic may function as:
If (SPC-IUT=0) then NCT=DCT
If (SPC-IUT>SPC-TA) then NCT=(SPC-IUT−SPC-TA+Delay)/N
If (SPC-IUT<SPC-TA) then NCT=Max of (SPC-TA, Delay)
*If drop rate percent is more than setting, then the following is the logic to slow down dialing process within acceptable parameters.
*If (FC<=DC) then wait (no calling) else continue
Until the drop rate reaches desired point, this process will continue. Here no settings work. If you want to speed up process, just increase drop rate percentage setting.

LIST OF DEFINITIONS

DCT=Default Call Time
NCT=Next Call Time
SPC-IUT=Statistical Process Control In Use Time
SPC-TTA=Average Time To Answer
Delay=Delay Analyze
N=Number of agents logged in
FC=Free Agent Count
DC=Current Dial Count A non-limiting exemplary embodiment of the algorithm of the present disclosure may or may not include a specific number of telephone lines per agent, total lines for the whole campaign, the drop rate percentage (the number of live contacts the system hangs up on), the delay analysis, the default call time, and other settings. Its versatility makes it adaptable to almost any business environment and almost any business need.

Non-Limiting Exemplary Alternate Embodiments

The call center dialing system may be used for a company that wishes to contact or receive a plurality of calls, newspaper circulation center, tech support centers, and customer support center. Sales organizations, political campaigns, and other applications not designated may use the present disclosure in creative ways. It may even be used with iPhone® and with other types of cell phone applications.

There has thus been outlined, rather broadly, the more important features of the disclosure in order that the detailed description thereof that follows may be better understood, and in order that the present contribution to the art may be better appreciated.

As a non-limiting example, the application server (processor) 40, may be communicatively coupled to the web service/SOAP 20 and dialer engine 70, hosts information, documents, scripts and software needed to provide user interfaces and enable performance of methodologies in accordance with an exemplary embodiment of the disclosure. By way of example and not limitation, the web application server may include web page information, documents and scripts (e.g., HTML and XML code), applets and application software, which enable users to submit valuation requests and display valuation data in response to valuation requests from users.

A plurality of users (e.g., agents, administrator, etc.) may access the web application server using compatible computing devices with network connectivity. By way of example, such devices may include personal computers, laptop computers, handheld computers a/k/a personal digital assistants, kiosks, mobile phones or any compatibly equipped electronic computing devices. User computing systems may include an operating system and a browser or similar application software configured to properly process and display information, documents, software, applications, applets and scripts provided by the web application server.

The present disclosure is not limited to any particular network connectivity or communication protocol. Various forms of communication networks may be used by the user computers to access the web application server. By way of example and not limitation, a proprietary Wide Area Network (WAN) or a public WAN, such as the Internet, may be used. These networks typically employ various protocols such as the HyperText Transfer Protocol (HTTP), File Transfer Protocol (FTP), Extensible Markup Language (XML), and Transfer Control Protocol/Internet Protocol (TCP/IP) to facilitate communication of information between communicatively coupled computers. An exemplary call dialing system according to the present disclosure may also utilize wireless networks, including those utilizing Global System for Mobile (GSM), Code Division Multiple Access (CDMA) or Time Division Multiple Access technology, and the Wireless Application Protocol (WAP). Furthermore, a system according to the disclosure may utilize any, all, and any combination of such communications networks, as well as communications networks hereafter developed.

The computing devices described herein (e.g., personal computers, handheld computers [e.g., PDAs and servers) may be comprised of commercially available computers, hardware and operating systems. The aforementioned computing devices are intended to represent a broad category of computer systems capable of functioning in accordance with the present disclosure. Of course, the computing devices may include various components, peripherals and software applications provided they are compatible and capable of performing functions in accordance with the present disclosure. The computing devices also include information, documents, data and files needed to provide functionality and enable performance of methodologies in accordance with an exemplary embodiment of the disclosure.

In a non-limiting exemplary embodiment, a firewall may be located between application server 40 and the administrator interface 10 as well as the agent interface 210, to protect against corruption, loss, or misuse of data. The firewall limits access by the interfaces 10, 110, 210 to the application server 40 and prevents corruption of point-of-sale (POS) data. Thus, the application server 40 may be configured to update and receive data only to the extent necessary. The firewalls may be comprised of any hardware and/or software suitably configured to provide limited or restricted access to the database server. The firewalls may be integrated within the application server 40 or another system component, or may reside as a standalone component.

In FIG. 5, the dialer engine 500 is started, and the algorithm starts reading dialing parameters 510 from the database 600. Once these settings are read, the dialing queries 520 are read to determine which numbers are dialed from the database. At this point and time the engine cannot initiate dialing until there becomes an agent available to receive the call. Once an agent logs into the system, the dialing algorithm finishes reading the dialing parameters 510, agent count, and drop rate specification and starts the dialing sequence. The algorithm's job is to measure statistics of each call, as well as read the parameters for that campaign to maintain a constant dialing pattern, where customers are called and handed off to agents while maintaining the parameters set for that campaign.

In a non-limiting example, say there are 4 agents logged into the system, and the dialing parameters are 2 lines per agent, drop rate of 3%. The initial dialing begins with 8 lines dialing in this situation, then those call statistics are measured and the algorithms adjusts to stay within parameters. The dialing algorithm maintains a delicate balance of sending customers to agents at a fast enough pace that the agents always have a call waiting, preferably as soon as they become available. In addition, the algorithm maintains a good customer contact percentage without having the engine "drop" a call because of no availability of an agent. This balancing act is always being adjusted by the measured statistics of the engines previous calls, and the parameters setup for that campaign by the manager, which sometimes may be changed during the middle of dialing a campaign. Sometimes the dialing algorithm can dial at too fast a pace 560, causing an extraordinarily large amount of "dropped" calls. To control this dropped calls to within FTC federal guidelines, a portion of the software monitors the specifications, and if needed can slow the dialing 570, or speed the dialing to maintain specified range of contacts. Once back within range, the dialing is handed back over to the dialing algorithm 580 to continue.

Figure 6:
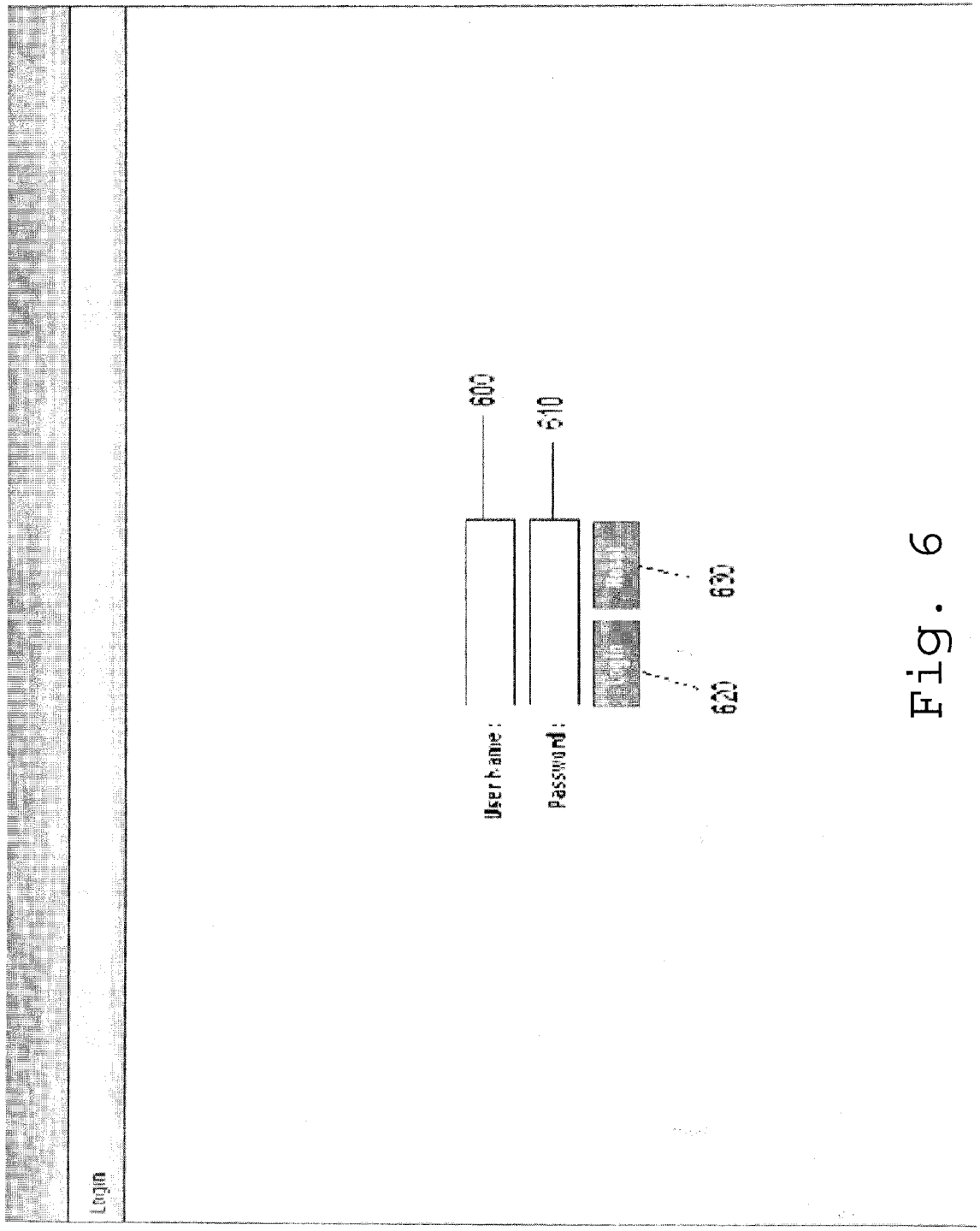
FIGS. 6-11, are exemplary screen images accessed by an agent while logged into the system.

In FIG. 6, an exemplary U 10, 110, 210 login screen is displayed. This login is for administrators and agents. Depending on the credentials, he/she may have a different UI 10, 110, 210. The login name 600 and password 610 must be entered. The password is case sensitive and is setup by the administrator of the dialing system. Once login and password are typed in, the user can either click on login 620 to log into the system and begin work, or he/she can click on the reset button to reset the login credentials, which clears the login information from the page.

Figure 7:
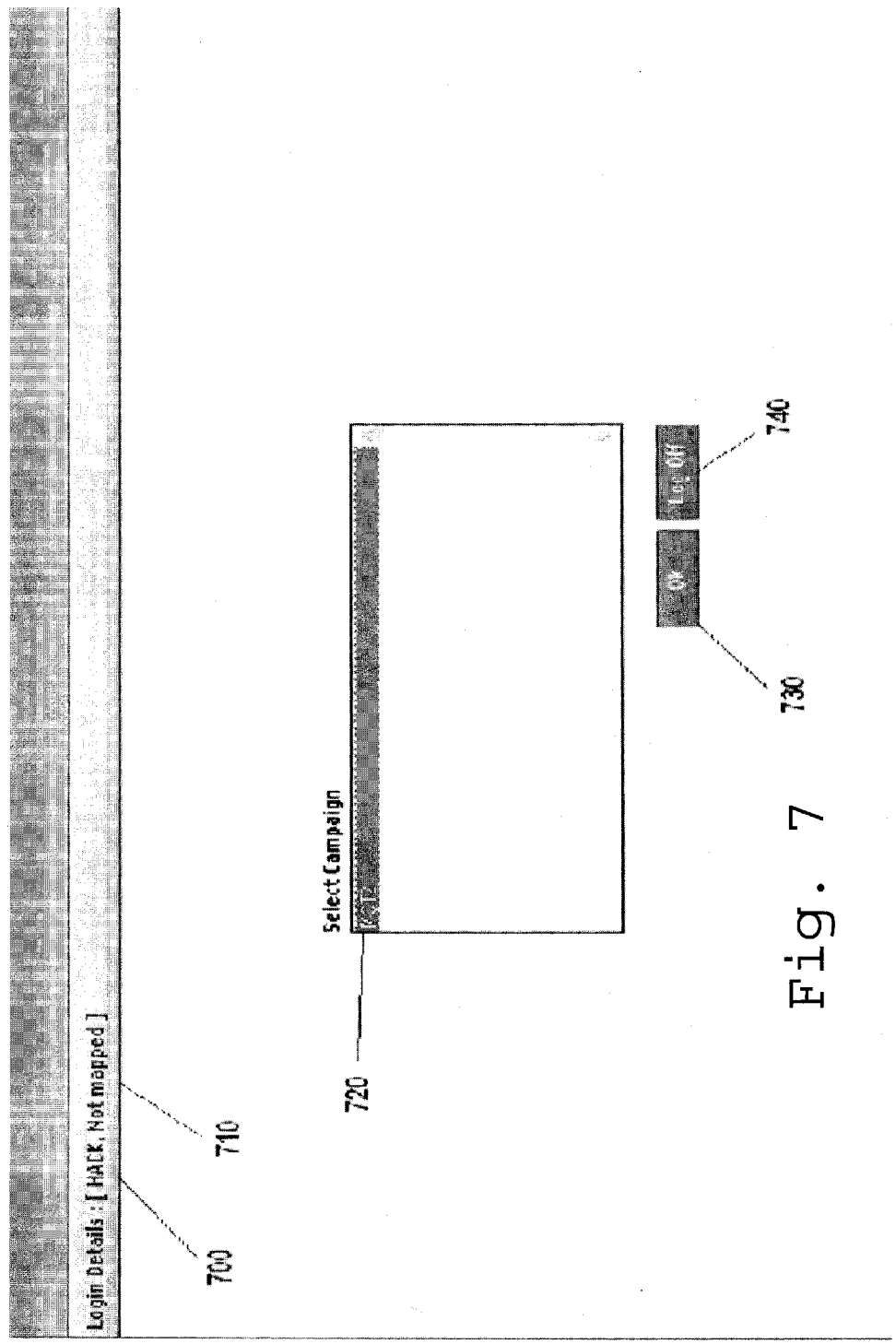

In FIG. 7, when logged as an agent, you will receive a list of all currently available campaigns. A campaign is "available" when it is in "run" mode only. When in idle or pause, the campaign will not appear in the list. The computer name that the agent is logging in from is mapped 700 computer name, so the system can send the data to the proper system. Section 710 illustrates a login from a computer not physically attached to the system. This may be a "Remote Agent" and the system knows by this login, that a call will have to be made to the agent to establish voice resource. Any valid phone number will work, either POTS, cell phone, VoIP etc. The agent selects from available campaigns in the list 720, then either selects OK 730 or Logoff 740 to exit the system.

Figure 8:
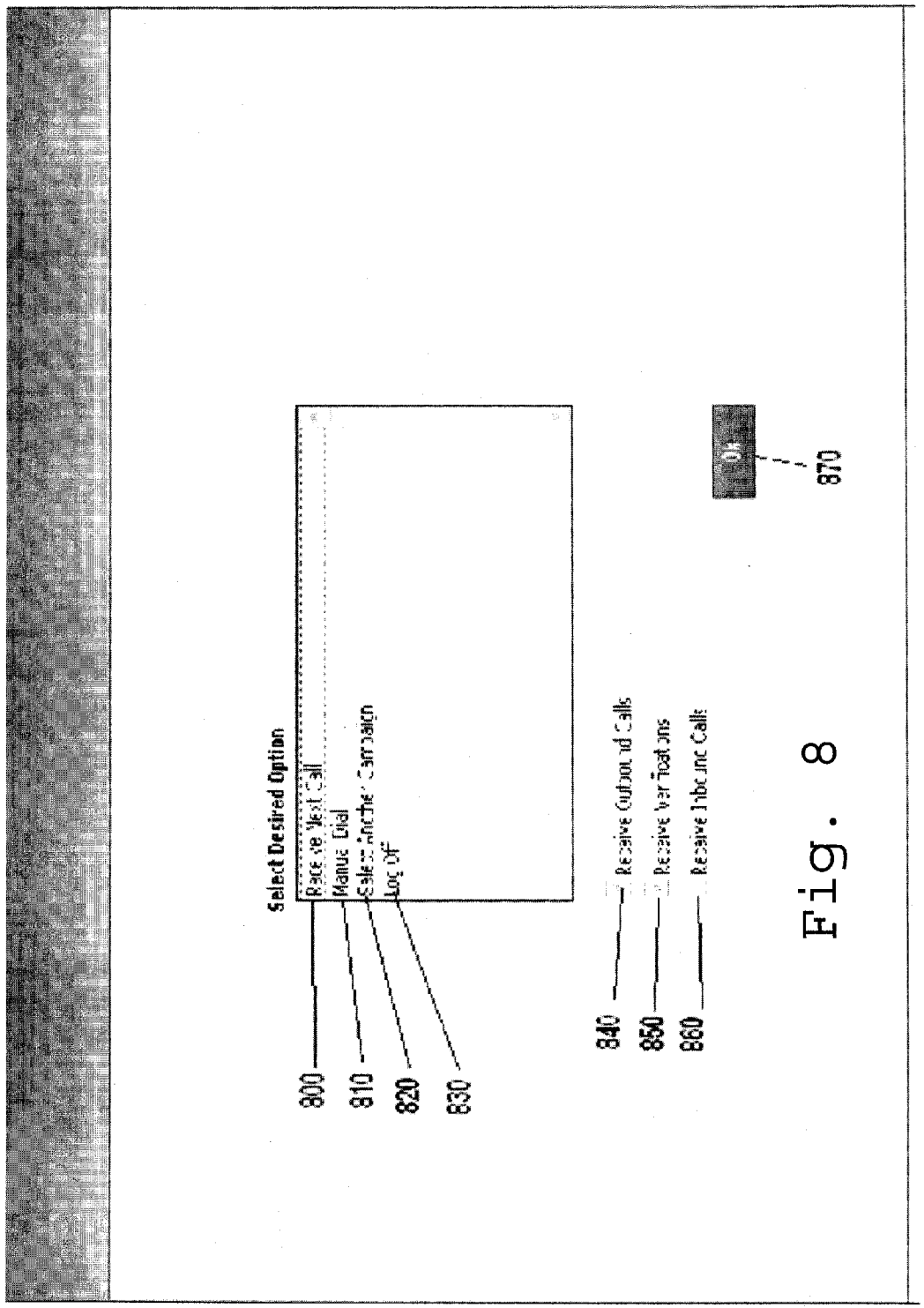

FIG. 8 is an exemplary screen for the agent to log into the system. There will be a list of options for the agent to choose from: 800 receive next call, 810 manual dial, 820 select another campaign, or 830 logoff the system. They will be assigned by the manager certain tasks for their credentials: 840 receive outbound calls, 850 receive verifications, or 860 receive inbound calls. The agent then click on ok to start receiving calls, if receive next call is selected.

Figure 9:
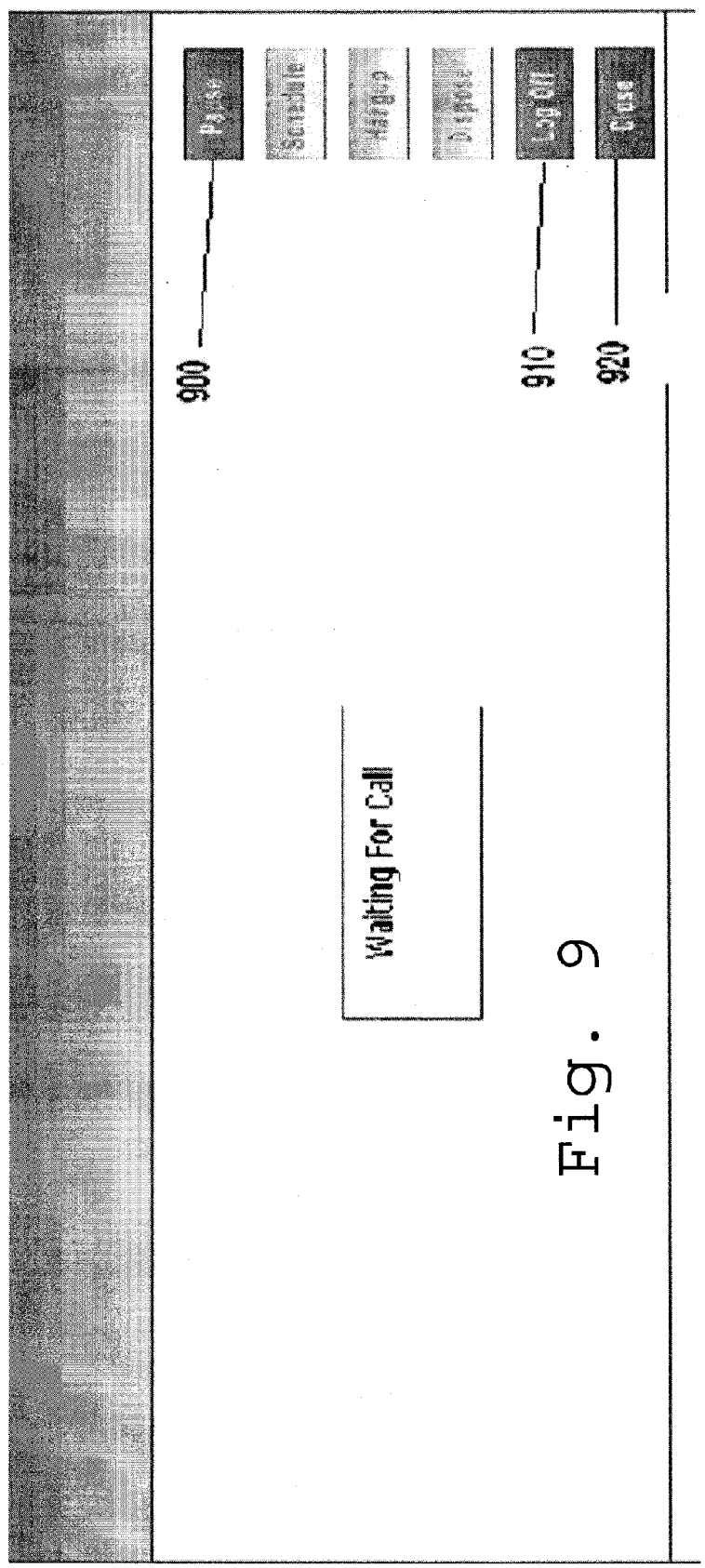

FIG. 9 is an exemplary screen the agent sees while waiting for a call. The agent can only chose between three options while in this state: 900 Pause, 910 Log off, or 920 close.

Figure 10:
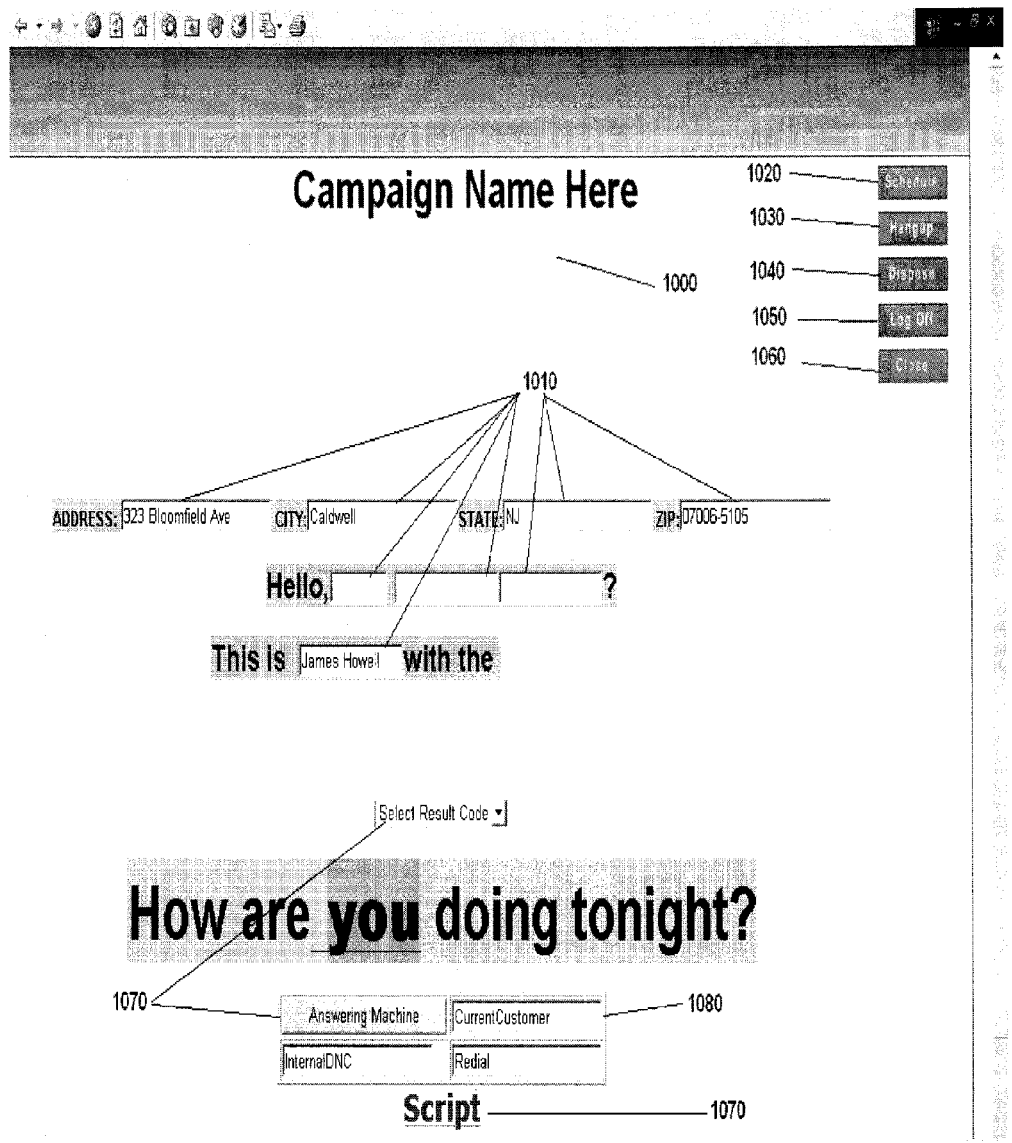

FIG. 10 is an exemplary screen, when a call is picked up by the engine and determined to be a live call, it is transferred to the next available agent along with the data and script for that call. The agent will immediately begin to read the script to the customer. In the script is the name of the campaign 1000, all the data for that customer such as name, address, city, state, zip and any other pertinent data 1010. The agents can edit these data fields by tabbing through them. Once an agent starts the dialog and finishes the offer, the call must end. When a call ends, an agent must disposition the call appropriately using result code buttons 1070, and dropdown result codes 1070 or even a third method of clicking on a dispose button 1040. The agent cannot logon or close until the call has been dispositioned which releases the call, at which time the agent becomes available to receive another call. The agent at this time has the option of Schedule 1020 a callback date, where the system will automatically call the customer back on that date, or hang up 1030, or log off 1050, or close the window 1060.

Figure 11:
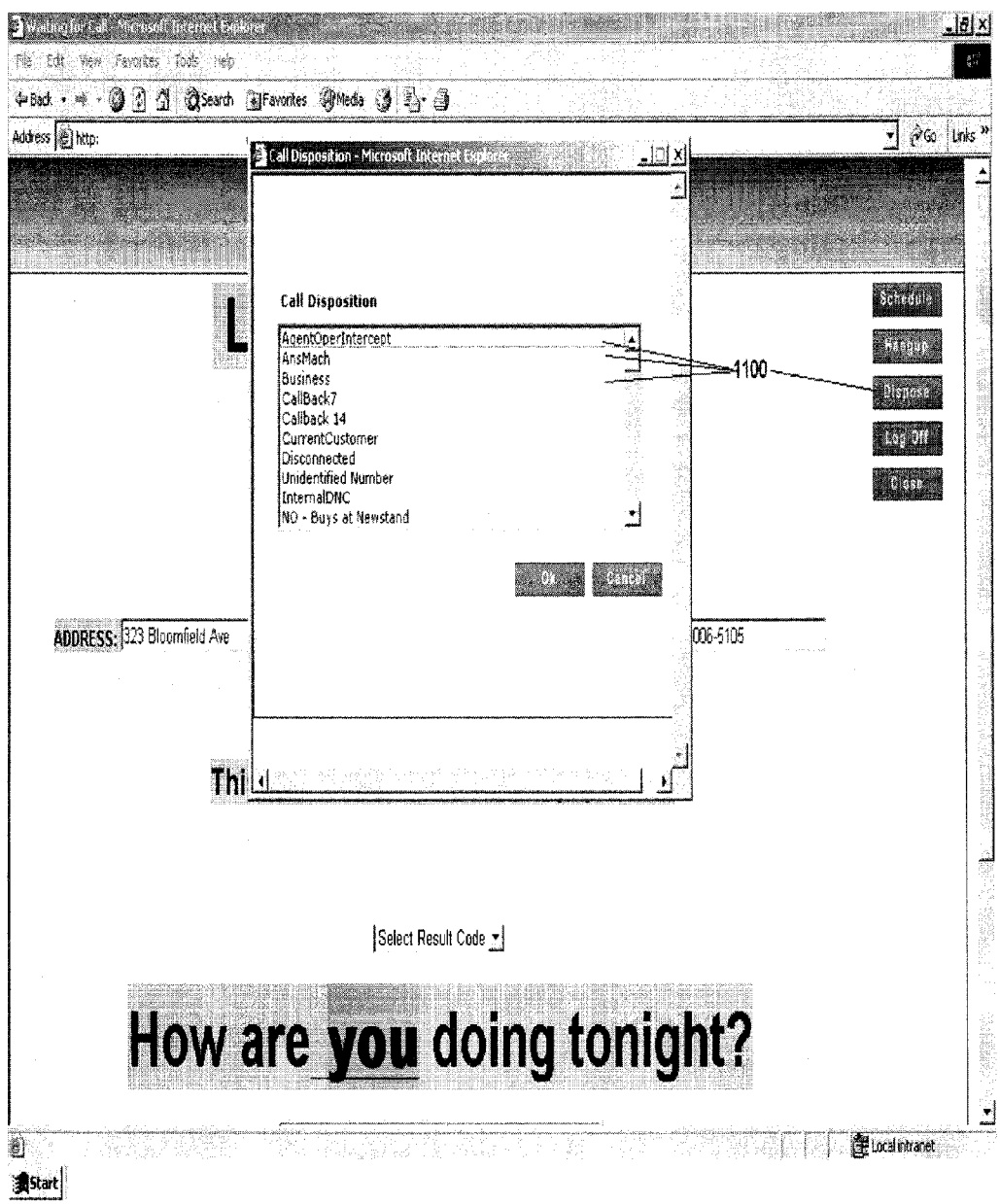

FIG. 11 shows an exemplary agent disposition window, which has listed the result codes defined by the manager. The agent must choose one of these options. Once clicked, the application will automatically start receiving calls to the agent again (e.g. FIG. 9 "waiting" screen), and continues to take calls until the manager stops or idles the campaign.

Figure 12:
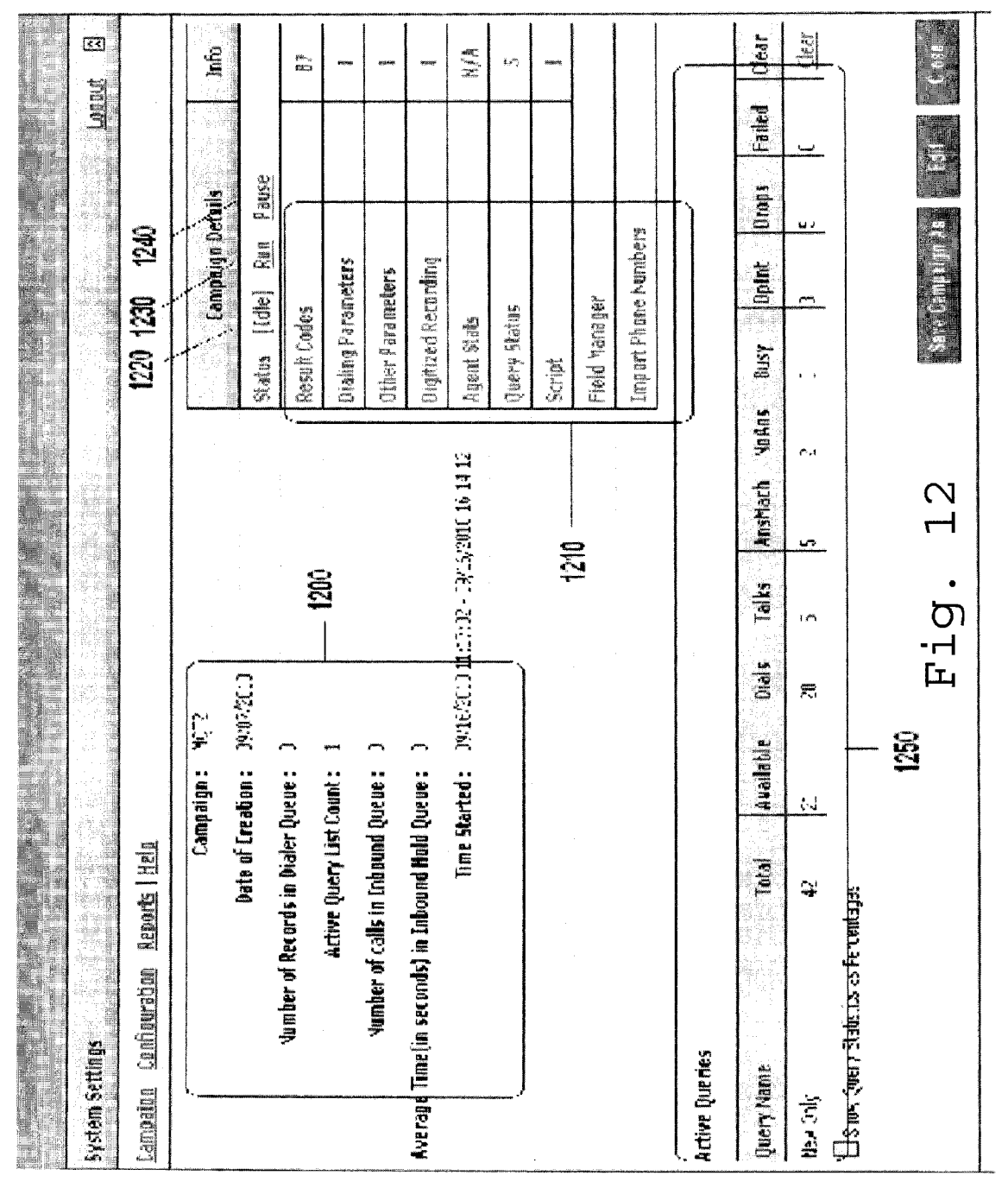

FIG. 12 shows an exemplary screen when logging in as administrator/manager. The main window is where the statistics for the campaign are listed 1200, as well as the statistics for dialing history for each query 1250. The parameters for the campaign 1000 are listed as links to other pages 1210 that need to be configured. An important part of this interface is the ability to idle a campaign 1220, run a campaign 1230, or pause a campaign 1240. This is the starting point for all campaigns.

Figure 13:
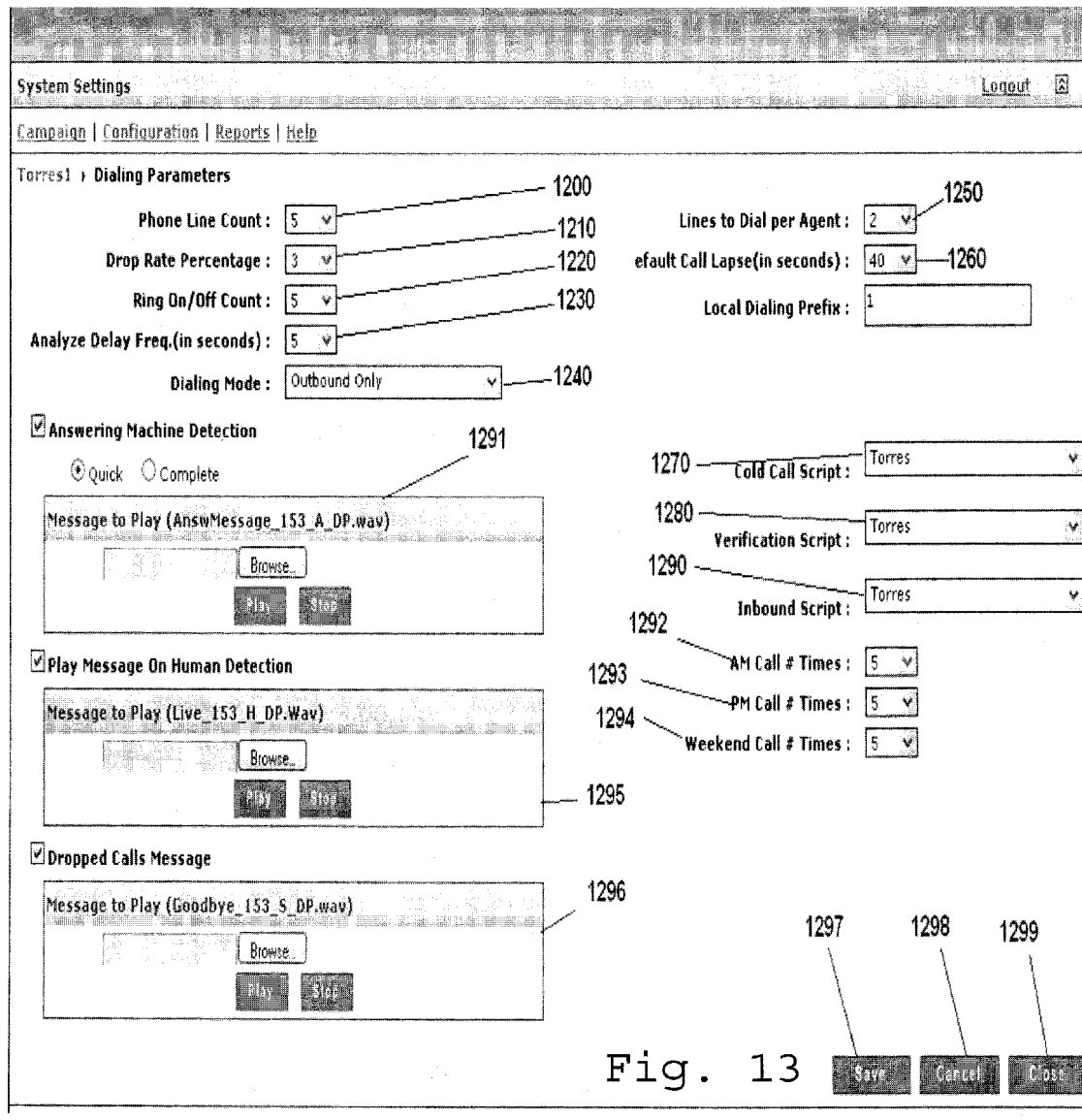

FIG. 13 shows an exemplary dialing parameters window wherein the manager/administrator can configure the parameters for dialing, which are used to directly change the dialing algorithm. Exemplary listed parameters include: phone line count 1200; drop rate percentage allowed by the campaign 1210; ring on/off count for each number dialed 1220; analyze delay frequency in seconds 1230; the dialing mode specified 1240; the messages to leave depending on the result code determined by the system 1291; lines to dial per agent 1250;

default call lapse 1260; and maximum allowed attempts for each number for am, pm and weekend 1292, 1293, 1294. This is the page where the script to be used is also assigned cold call script 1270, or verification script 1280, and finally the inbound script. Once all settings have been configured according to needs of this campaign, the manager can save 1297, cancel 1298 the changes, or close the window without saving 1299. The algorithm uses these settings to determine dialing behavior, and can be adjusted live (real-time) while dialing to tweak the system to specific needs.

Figure 14:
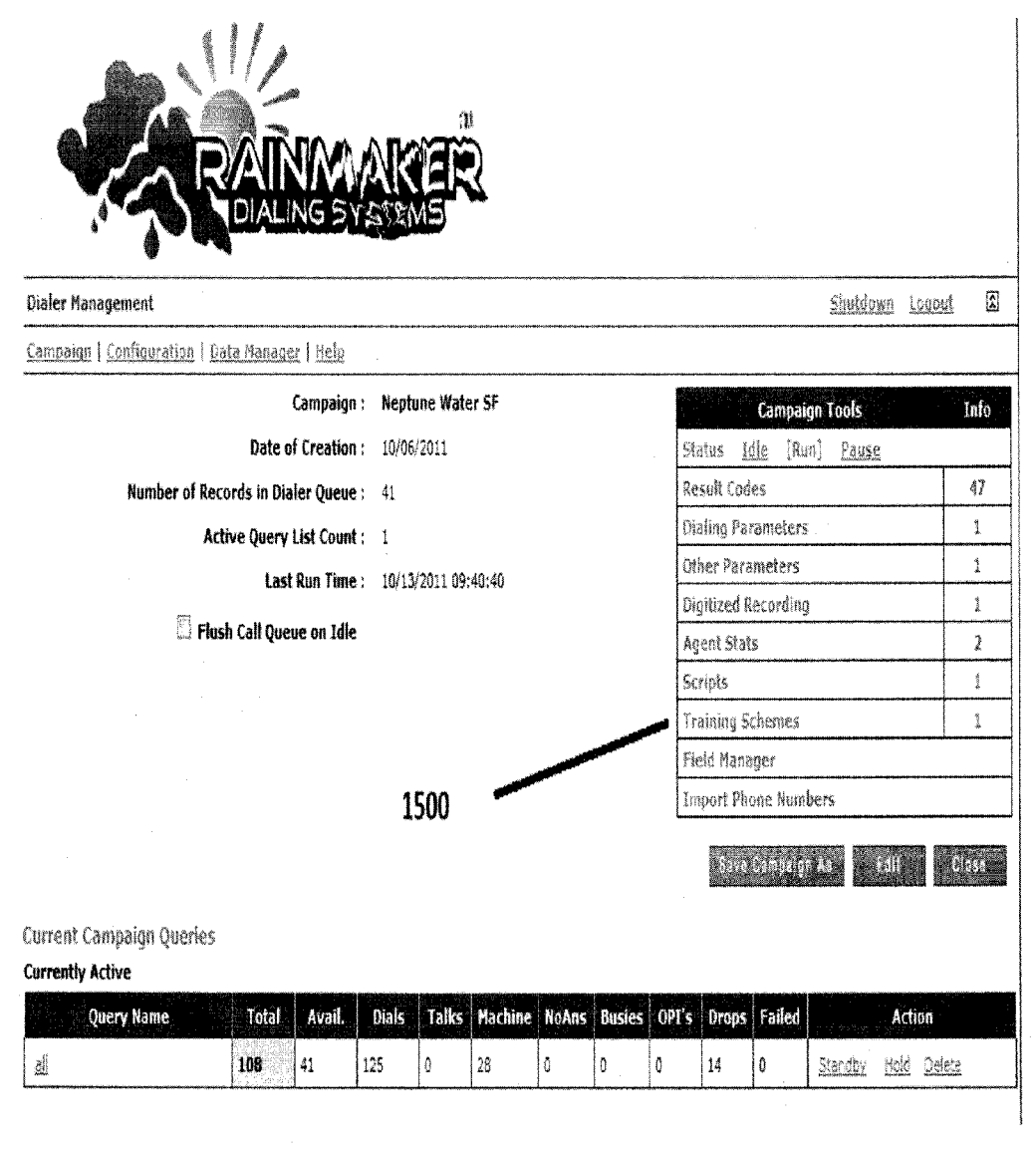

FIG. 14 shows an exemplary computer based training link 1500 wherein the manager/administrator can click on the link to create training pages. This link is called 'Training Schemes'. This link is on the main page of the campaign and each campaign has its own training pages assigned to it. An administrator is able to copy any training script to any campaign for training in that campaign.

Figure 15:
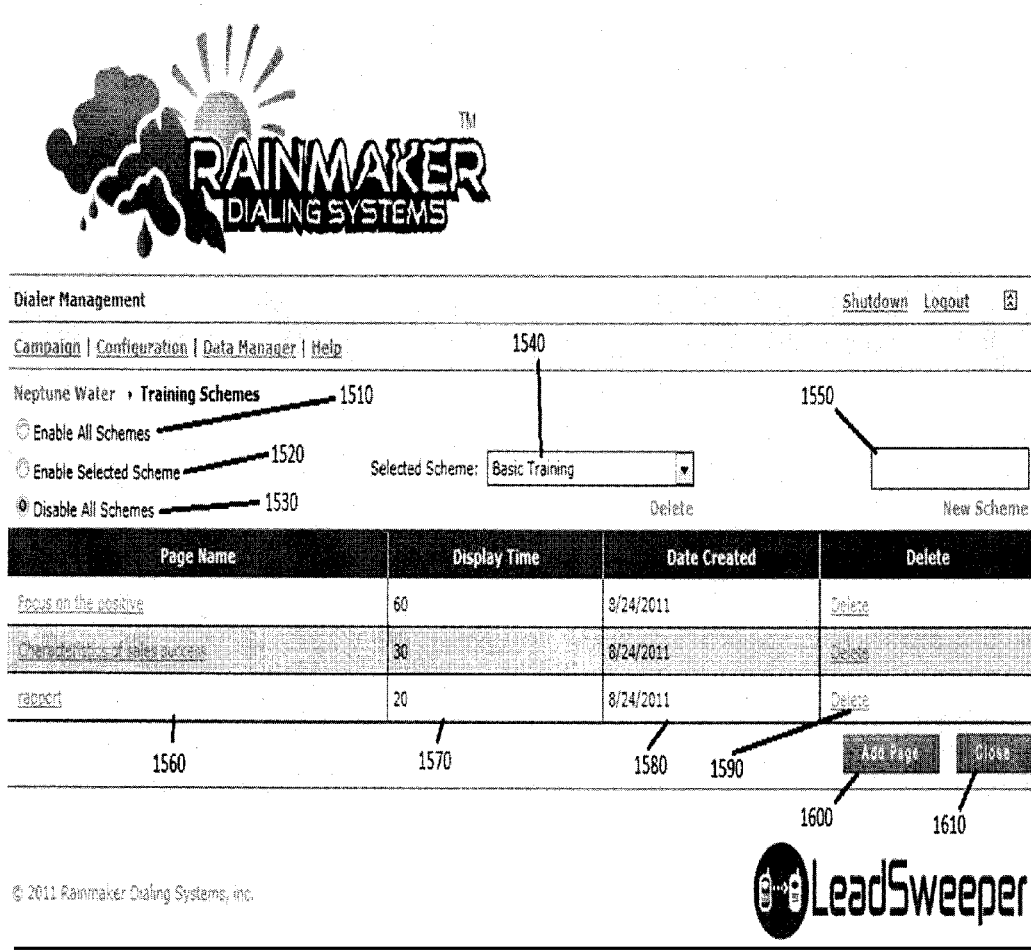

FIG. 15 shows an exemplary CBT configuration screen. There are three options for 'modes' of these training pages. For example, 1510 'Enable all schemes', 1520 'Enable selected scheme', and 1530 'Disable all schemes'. This allows the administrator to target certain scripts, all scripts or disable same. Drop down menu 1540 show the "Schemes" available to choose from. These are created by using the 'New Scheme' 1550 option and typing in a name such as 'Basic Training' in this example. In the table below the configuration options, are the Page Name 1560, Display time 1570, Date created 1580, and the delete option 1590. To edit the page, you click on the 'Page Name,' 1560 which is a link to the editor page where you can create the script fields, pictures, text and audio or video files. The display time 1570 link is in seconds, and this states how long to display that training page before moving on to the next page, if it exists. This can be set to any time you wish. Link 1580 shows the date the training script was created. The delete 1590 link is where an administrator can delete individual pages of training materials. He/She can add another page by clicking on the 'Add Page' 1600 link, or he/she can close out and return to the campaign screen by clicking on the 'Close' 1610 link. The training pages may use the same WYSIWYG editor as the script editor 180.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the disclosure of the application, nor is it intended to be limiting as to the scope of the disclosure in any way.

While the disclosure has been described with respect to certain specific embodiments, it will be appreciated that many modifications and changes may be made by those skilled in the art without departing from the spirit of the disclosure. It is intended, therefore, by the description hereinabove to cover all such modifications and changes as fall within the true spirit and scope of the disclosure. In particular, with respect to the above description, it is to be realized that the optimum dimensional relationships for the parts of the present disclosure may include variations in size, materials, shape, form, function and manner of operation.

What is claimed as new and what is desired to secure by Letters Patent of the United States is:

1. A customizable call center dialing system for reducing a call agent wait time between calls, comprising:
    means for displaying a computer based training module, on a screen of an application executing on a computing device, containing a plurality of customizable campaigns for a call center dialing system;
    means for selecting at least one of said customizable campaigns such that an authorized administrator can idle, run and pause said at least one customizable campaign on demand;
    means for creating a dialing algorithm containing a plurality of dialing parameters associated with said customizable campaign;
    means for creating a dialing query, based upon said plurality of dialing parameters, to determine which customer numbers to call during execution of said customizable campaign;
    means for modifying, in real-time, said plurality of dialing parameters such that a new call is predictively initiated close to a time when the call agent finishes a previous call; and
    means for selectively displaying a training script on a screen of the application executing on the computing device, based on past call result codes recorded by the call agent for the previous call, while the call agent waits for the new call;
    wherein said plurality of dialing parameters comprises
        a maximum number of the call agents,
        a maximum number of dialing lines per call agent,
        a maximum drop rate percentage,
        a ring count,
        a maximum default call lapse time,
        a call delay time, and
        a maximum number of allowed dialing attempts for each phone number in said dialing query.

2. The customizable call center dialing system of claim 1, wherein said dialing algorithm comprises the steps of:
    obtaining a dialing query based on selection of said plurality of dialing parameters;
    sequentially iterating said phone numbers contained in said dialing query such that said phone numbers are categorized as either a valid or invalid phone number according to said plurality of dialing parameters;
    if said phone numbers are valid, counting said maximum number of the call agents; and
    multiplying said maximum number of the call agents by said maximum number of dialing lines per call agent.

3. The customizable call center dialing system of claim 2, wherein said dialing algorithm further comprises the steps of:
    if at least one of said maximum number of dialing lines and at least one of said maximum number of call agents are available, initiating a dialing process based on said maximum number dialing lines per call agent;
    if the previous call is complete, waiting for a pre-established default call time period to lapse; and
    if a current drop rate percentage is less than said maximum drop rate percentage, initiating a next call time to predictively place the new call.

4. A method of utilizing a customizable call center dialing system to reduce a call agent wait time between calls, the method executing on at least one processor of a computing device, comprising the steps of:
    displaying a computer based training module, on a screen of an application executing on the computing device, containing a plurality of customizable campaigns for a call center dialing system;
    selecting at least one of said customizable campaigns such that an authorized administrator can idle, run and pause said at least one customizable campaign on demand;

creating a dialing algorithm containing a plurality of dialing parameters associated with said customizable campaign;

creating a dialing query, based upon said plurality of dialing parameters, to determine which customer numbers to call during execution of said customizable campaign;

modifying, in real-time, said plurality of dialing parameters such that a new call is predictively initiated close to a time when the call agent finishes a previous call; and selectively displaying a training script on a screen of the application executing on the computing device, based on past call result codes recorded by the call agent for the previous call, while the call agent waits for the new call;

wherein said plurality of dialing parameters comprises:
a maximum number of the call agents;
a maximum number of dialing lines per call agent;
a maximum drop rate percentage;
a ring count;
a maximum default call lapse time;
a call delay time; and
a maximum number of allowed dialing attempts for each phone number in said dialing query.

5. The method of claim 4, wherein said dialing algorithm comprises the steps of:
obtaining a dialing query based on selection of said plurality of dialing parameters;
sequentially iterating said phone numbers contained in said dialing query such that said phone numbers are categorized as either a valid or invalid phone number according to said plurality of dialing parameters;
if said phone numbers are valid, counting said maximum number of the call agents; and
multiplying said maximum number of the call agents by said maximum number of dialing lines per call agent.

6. The method of claim 5, wherein said dialing algorithm further comprises the steps of:
if at least one of said maximum number of dialing lines and at least one of said maximum number of call agents are available, initiating a dialing process based on said maximum number dialing lines per call agent;
if the previous call is complete, waiting for a pre-established default call time period to lapse; and
if a current drop rate percentage is less than said maximum drop rate percentage, initiating a next call time to predictively place the new call.

7. A computer program product comprising non-transitory computer usable medium encoded in a computer having control logic stored therein for causing the computer to provide a customizable call center dialing system, said control logic comprising:
first computer readable program code means for displaying a computer based training module, on a screen of an application executing on the computing device, containing a plurality of customizable campaigns for a call center dialing system;

second computer readable program code means for selecting at least one of said customizable campaigns such that an authorized administrator can idle, run and pause said at least one customizable campaign on demand;

third computer readable program code means for creating a dialing algorithm containing a plurality of dialing parameters associated with said customizable campaign;

fourth computer readable program code means for creating a dialing query, based upon said plurality of dialing parameters, to determine which customer numbers to call during execution of said customizable campaign;

fifth computer readable program code means for modifying, in real-time, said plurality of dialing parameters such that a new call is predictively initiated close to a time when the call agent finishes a previous call; and sixth computer readable program code means for selectively displaying a training script on a screen of the application executing on the computing device, based on past call result codes recorded by the call agent for the previous call, while the call agent waits for the new call;

wherein said plurality of dialing parameters comprises:
a maximum number of the call agents;
a maximum number of dialing lines per call agent;
a maximum drop rate percentage;
a ring count;
a maximum default call lapse time;
a call delay time; and
a maximum number of allowed dialing attempts for each phone number in said dialing query.

8. The computer program product of claim 7, wherein said dialing algorithm comprises the steps of:
obtaining a dialing query based on selection of said plurality of dialing parameters;
sequentially iterating said phone numbers contained in said dialing query such that said phone numbers are categorized as either a valid or invalid phone number according to said plurality of dialing parameters;
if said phone numbers are valid, counting said maximum number of the call agents; and
multiplying said maximum number of the call agents by said maximum number of dialing lines per call agent.

9. The computer program product of claim 8, wherein said dialing algorithm further comprises the steps of:
if at least one of said maximum number of dialing lines and at least one of said maximum number of call agents are available, initiating a dialing process based on said maximum number dialing lines per call agent;
if the previous call is complete, waiting for a pre-established default call time period to lapse; and
if a current drop rate percentage is less than said maximum drop rate percentage, initiating a next call time to predictively place the new call.

\* \* \* \* \*